(12) United States Patent
Shimokochi et al.

(10) Patent No.: US 8,801,988 B2
(45) Date of Patent: Aug. 12, 2014

(54) SOLUTION CASTING METHOD FOR PREVENTING SKINNING

(75) Inventors: Taro Shimokochi, Kanagawa (JP); Kazuhiro Koguchi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 357 days.

(21) Appl. No.: 12/180,588

(22) Filed: Jul. 28, 2008

(65) Prior Publication Data

US 2009/0026652 A1 Jan. 29, 2009

(30) Foreign Application Priority Data

Jul. 26, 2007 (JP) ................................ 2007-194323

(51) Int. Cl.
*B29D 7/00* (2006.01)
(52) U.S. Cl.
USPC ............................ 264/216; 264/165; 264/212
(58) Field of Classification Search
USPC .................................... 264/216, 1.6, 165, 212
See application file for complete search history.

(56) References Cited

U.S. PATENT DOCUMENTS 5,393,476 A * 2/1995 Suzuki ........................... 264/169
2004/0212112 A1* 10/2004 Tsujimoto .................... 264/1.34

FOREIGN PATENT DOCUMENTS

| JP | 2-208650 | 8/1990 |
|---|---|---|
| JP | 2002-103361 | 4/2002 |
| JP | 2002-337173 | 11/2002 |
| JP | 2003-181857 | 7/2003 |
| JP | 2005-193691 | 7/2005 |
| JP | 2005-212193 | 8/2005 |
| JP | 2005-246693 | 9/2005 |

OTHER PUBLICATIONS

JP Office Action dated Aug. 1, 2012, Application No. 2008-185122.

* cited by examiner

*Primary Examiner* — Benjamin Schiffman
(74) *Attorney, Agent, or Firm* — Young & Thompson (57) ABSTRACT

A dope is cast from a discharge opening of a casting die onto a casting drum. A casting bead is the dope between the discharge opening and the casting drum. A nozzle and a guide path are provided downstream from the discharge opening with respect to a moving direction (direction X) of the casting drum. The guide path is formed on a tapered surface of the casting die. The nozzle supplies an anticoagulant to the guide path. The anticoagulant is guided to a bottom end of the guide path. Upon reaching the bottom end, the anticoagulant forms a pool in the close vicinity of an end E of the discharge opening. The anticoagulant is securely supplied to a side edge portion of the casting bead through the pool.

5 Claims, 6 Drawing Sheets

SOLUTION CASTING METHOD FOR PREVENTING SKINNING

FIELD OF THE INVENTION

The present invention relates to a solution casting method for producing a polymer film and a device for preventing skinning which is formed during casting of a dope.

BACKGROUND OF THE INVENTION

A polymer film (hereinafter referred to as TAC film) formed of cellulose ester, in particular, cellulose triacetate (hereinafter referred to as TAC) with average acetylation degree of 58.0% to 62.0% is used as a film support for a photographic photosensitive material owing to its toughness and fire-resistant property. Because of its excellent optical isotropy, the TAC film is used as a protection film for a polarizing filter in an LCD device whose market is expanding.

The TAC film is produced by a solution casting method. The solution casting method is capable of producing the film with superior physical properties such as optical property when compared to other film producing method such as a melt-extrusion method. In the solution casting method, a high polymer solution (hereinafter referred to as dope) in which a polymer is dissolved in a mixed solvent containing dichloromethane or methyl acetate as a main solvent is prepared. The dope is cast from a casting die onto a support to form a casting film. A casting bead is the dope between a discharge opening (a slit) and the support. Upon obtaining a self supporting property on the support, the casting film is peeled off from the support as a wet film. The peeled wet film is sent to a tenter device through a transfer section provided with a plurality of rollers. In the tenter device, the wet film is dried while being stretched in a width direction. Thus, a film is produced. Thereafter, the film is dried again and wound by a winding device.

At the casting of the dope, both side edge portions of the casting bead in the width direction are tend to dry up faster than the center portion of the casting bead. As a result, agglomeration that is semi-solidified dope in an icicle-like shape is frequently formed at each side edge portion of the discharge opening of the casting die, and skinning is frequently formed on the both side edge portions of the casting bead. Conventionally, to prevent drying of the casting bead, an anticoagulant composed of a solvent of a dope or the like is supplied through a liquid supplying nozzle (see U.S. Pat. No. 5,393,476 corresponding to Japanese Patent No. 2687260, and Japanese Patent Laid-Open Publication No. 2002-337173), or both side edge portions of the discharge opening of the casting die are formed in specific shapes (see Japanese Patent Laid-Open Publication No. 2002-103361).

On the other hand, in the case the casting is performed at a high speed, it becomes necessary to rotate an endless support (for example, a casting drum or a casting belt) at a high speed accordingly. As the film production speed increases, an air flow generated by the rotation of the support becomes a serious problem. Such air flow is one of important factors which cause vibrations (flapping) of the casting bead. To eliminate the influence of the air flow to the casting bead, a decompression chamber is disposed in an upstream direction from the casting bead with respect to the moving direction of the support to reduce the air flow. The vibrations of the casting bead caused by the above air flow are reduced by supplying a solvent similar to the above anticoagulant to the both side edge portions of the casting bead (see Japanese Patent Laid-Open Publication No. 2003-181857).

In order to further improve production efficiency of the polymer film, it is effective to increase the casting speed and the width of the film. Additionally, the market demands a thinner and lighter LCD, which requires a thinner polymer film used as a protection film for the LCD. However, increasing the casting width and thinning the casting bead result in spattering of the anticoagulant due to the suction air of the decompression chamber under high decompression when the anticoagulant is supplied to each side edge portion of the casting bead only by using a liquid supply nozzle as in the conventional methods. Therefore, it has been difficult to supply the anticoagulant to an appropriate location, and skinning and the agglomeration have been frequently formed at the both side edge portions of the casting bead and the discharge opening.

SUMMARY OF THE INVENTION

In view of the foregoing, an object of the present invention is to provide a solution casting method and a device for preventing skinning capable of supplying an anticoagulant to both side edge portions of a casting bead stably and accurately.

In order to achieve the above and other objects, a solution casting method according to the present invention has the following steps: discharging a dope containing a polymer and a solvent from a slit of a casting die onto a moving endless support to form a casting film; discharging an anticoagulant from an orifice of a liquid supplying nozzle toward a side edge of the slit, and the orifice is located above the slit, and the anticoagulant is a liquid; forming a pool of the anticoagulant in the close vicinity of the side edge of the slit by guiding the discharged anticoagulant to the close vicinity of the side edge of the slit using a guide path; supplying, through the pool, the anticoagulant to the side edge of the slit and a side edge portion of a casting bead in a width direction of the support, and the casting bead is the dope between the slit and the support; peeling the casting film from the support as a wet film; and producing a film by drying the wet film.

It is preferable that the guide path is located downstream from the slit with respect to a moving direction of the support, and formed on a surface of the casting die. It is preferable that a width of the casting die in the moving direction of the support is gradually tapered down toward the slit, and the casting die has a tapered surface located between a front surface and a land surface having the slit when the casting die is viewed from downstream in the moving direction of the support. It is preferable that the orifice of the liquid supplying nozzle is located on the tapered surface in a position closer to a center of the casting die than the side edge of the slit with respect to the width direction of the support. It is preferable that the guide path is located on a diagonal line connecting the orifice and the side edge portion of the casting bead.

It is preferable that the guide path is constituted of a groove or a protrusion formed on the tapered surface. It is preferable that the liquid supplying nozzle has a guide section on its tip. A height of the guide section is gradually reduced with respect to the tapered surface toward a lower end of the guide section. The guide section preferably constitutes the guide path. It is preferable that the polymer is cellulose acylate, and a supply rate of the anticoagulant is at least 0.05 $cm^3$/min and at most 0.85 $cm^3$/min. It is preferable that the anticoagulant is a solvent mixture of dichloromethane and methanol, and a ratio of the dichloromethane/methanol is at least 2/3 and at most 3/2.

It is preferable that a decompression chamber for decompressing an upstream side from the casting bead with respect to the moving direction of the support is provided to the casting die. It is preferable that the moving speed of the support is at least 50 m/min. It is preferable that a thickness of the film is at least 20 μm and at most 80 μm. It is preferable that a width of the film is at least 1.5 m and at most 3.0 m.

In the present invention, a device for preventing skinning includes a liquid supplying nozzle and a guide path. The liquid supplying nozzle has an orifice above a slit, and discharges an anticoagulant from the orifice toward a side edge of the slit. The anticoagulant is a liquid. The guide path guides the anticoagulant discharged from the orifice to the close vicinity of the side edge of the slit, and forms a pool of the anticoagulant in the close vicinity of the side edge of the slit. The anticoagulant is supplied to the side edge of the slit and a side edge portion of the casting bead through the pool. The device for preventing skinning is used in a solution casting line in which a dope containing a polymer and a solvent is discharged from the slit of a casting die onto a moving endless support to form a casting film, and the casting film is peeled off as a wet film from the support, and a film is produced by drying the wet film. A casting bead is the dope between the slit and the support. The device for preventing skinning supplies the anticoagulant to the both side edge portions of the casting bead in the width direction of the support to prevent formation of skinning on the both side edge portions of the casting bead.

According to the present invention, the anticoagulant is stably and accurately supplied to the both side edge portions of the casting bead.

BRIEF DESCRIPTION OF THE DRAWINGS

The above and other subjects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE PREFERRED EMBODIMENTS

Figure 1:
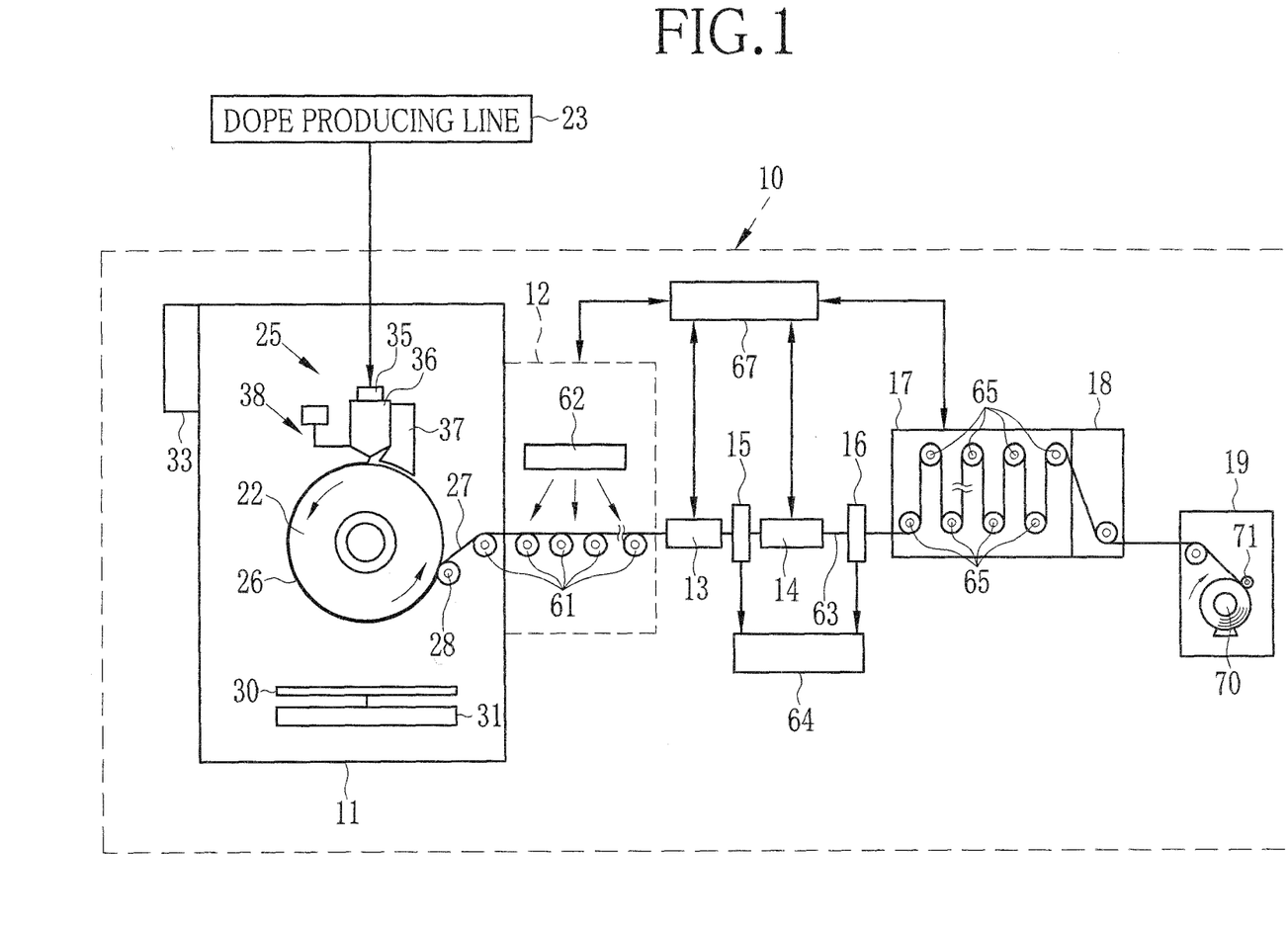
FIG. 1 is a schematic view of a film producing line.

As shown in FIG. 1, a film producing line 10 has a casting chamber 11, a transfer section 12, a pin tenter 13, a clip tenter 14, edge slitting devices 15 and 16, a drying device 17, a cooling device 18, and a winding device 19.

The casting chamber 11 is provided with a casting drum 22, a casting unit 25, a peel roller 28, a condenser 30, and a recovery device 31. The casting drum 22 is a support. The casting unit 25 is used for casting a dope sent from a dope producing line 23 onto the casting drum 22. The peel roller 28 peels a casting film 26 from the casting drum 22 as a wet film 27. The condenser 30 liquefies and condenses solvent vapors evaporated from the casting film 26. The recovery device 31 recovers the liquefied solvent. A heat transfer medium supplying device (not shown) is connected to the casting drum 22. A surface temperature of the casting drum 22 is adjusted to a desired temperature by supplying a heat transfer medium inside the casting drum 22. The casting chamber 11 is provided with a temperature controller 33 to control the inner temperature of the casting chamber 11.

The casting drum 22 is a stainless steel drum capable of continuous rotation. A surface of the casting drum 22 is polished. Thereby, the casting film 26 with excellent planarity is formed on the casting drum 22. Here, the casting drum is used as the support. However, the support is not limited to the casting drum. For example, it is possible to use an endless casting belt looped around a pair of rollers and rotated continuously. It is preferable that a width of the support is 1.1 times to 2.0 times larger than that of the dope. It is preferable that the material of the dope has high strength and corrosion resistance, for example, stainless steel. It is preferable that the moving speed of the casting drum 22 is at least 50 m/min.

The casting unit 25 is provided with a feed block 35, a casting die 36, a decompression chamber 37, and a liquid supplying section 38. A flow path of the dope is formed inside the feed block 35. By adjusting the arrangement of the flow path, the casting film 26 having a desired structure is produced. The feed block 35 is attached to the casting die 36.

Figure 2:
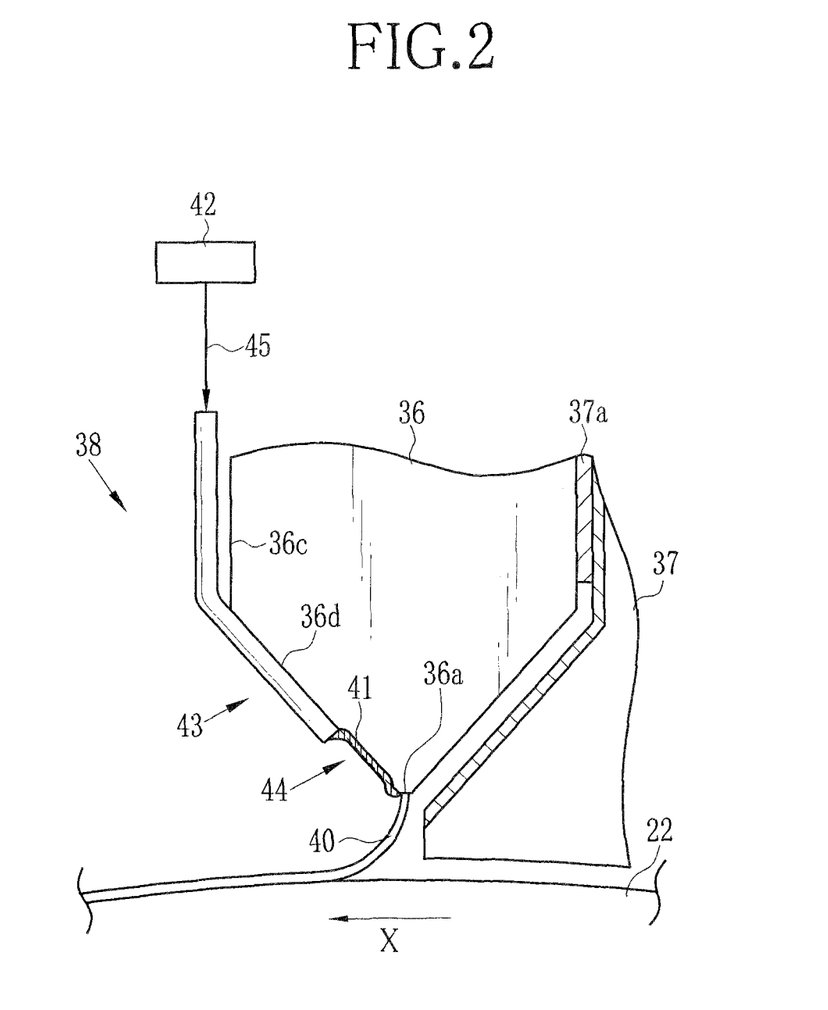
FIG. 2 is a front view of a casting die and its vicinity.

As shown in FIG. 2, the casting die 36 has a discharge opening (slit) 36a. A width (thickness) of the casting die 36 in the moving direction (hereinafter referred to as direction X) of the casting drum 22 tapers down toward the discharge opening 36a. The casting die 36 has a land surface 36b (see FIG. 3), a front surface 36c, and a tapered surface 36d. The land surface 36b is a surface of the casting die 36 on which the discharge opening 36a is formed in the width direction of the casting drum 22. The front surface 36c is an upper front surface of the casting die 36 when viewed from the downstream side of the casting die 36 with respect to the direction X. The tapered surface 36d is a surface of the casting die 36 between the front surface 36c and the land surface 36b. The dope from the feed block 35 is cast onto the casting drum 22 through the discharge opening 36a. Thus, a casting bead 40 is formed between the discharge opening 36a and the casting drum 22.

The decompression chamber 37 is installed upstream from the casting die 36 with respect to the direction X through a packing (gasket) 37a. The decompression chamber 37 reduces pressure of an upstream side from the casting bead 40 with respect to the direction X to stabilize the contact of the casting bead 40 with the casting drum 22.

Figure 3:
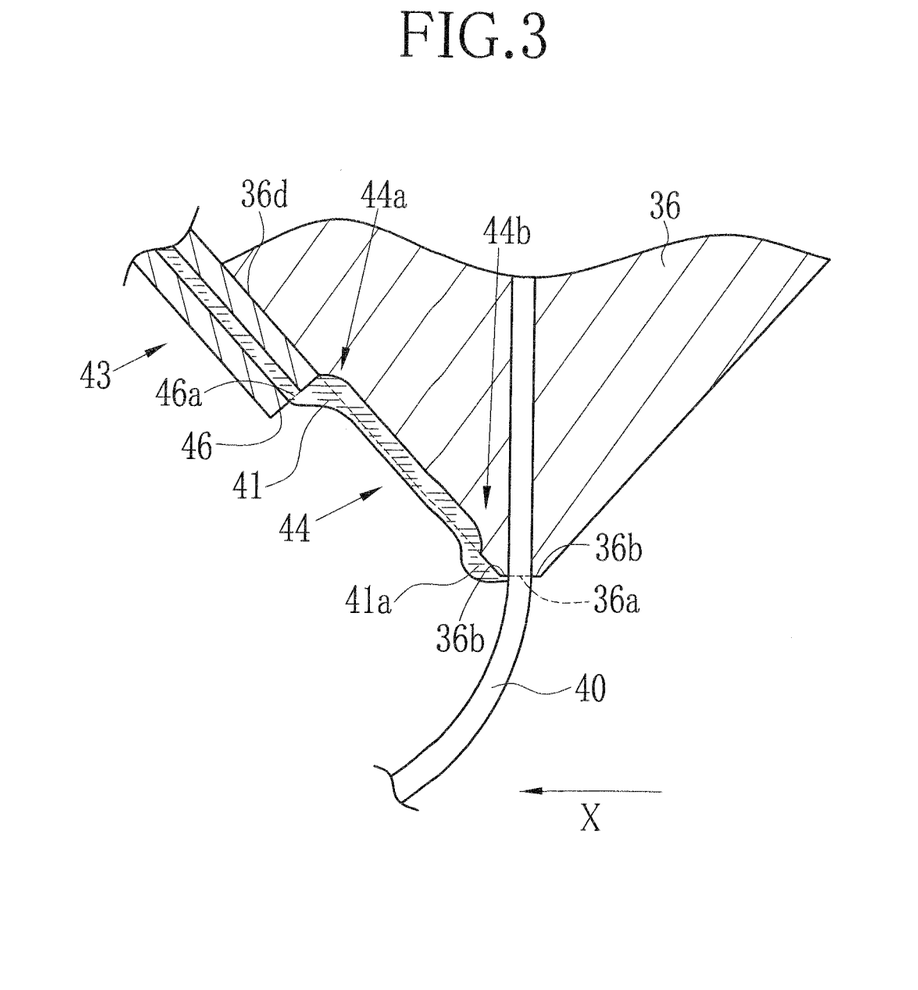
FIG. 3 is a cross-section view of a tip of the casting die and its vicinity.
Figure 4:
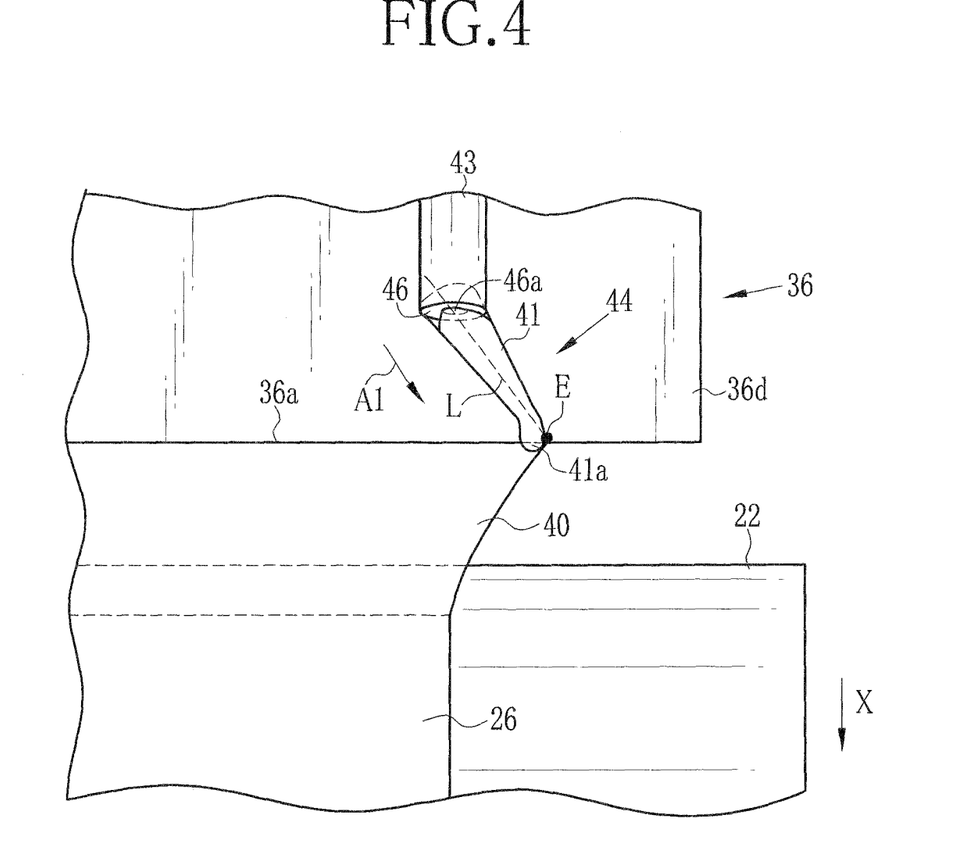
FIG. 4 is a lateral view of the tip of the casting die in the width direction and its vicinity.

The liquid supplying section 38 supplies an anticoagulant 41 to each side edge portions of the casting bead 40 in the width direction to prevent solidification of the dope and flapping of the casting bead 40. The liquid supplying section 38 is provided with a tank 42, a nozzle 43, and a guide path 44. The tank 42 stores the anticoagulant 41 containing dichloromethane and methanol. It is preferable that a mass ratio of dichloromethane/methanol is at least 2/3 and at most 3/2. The anticoagulant is a liquid and supplied from the tank 42. The tank 42 and the nozzle 43 are connected through a pipe 45. The pipe 45 is provided with a valve, a pump, a flow meter, and the like (all not shown). By operating the valve and the like, a predetermined amount of the anticoagulant 41 is supplied to the nozzle 43. FIGS. 2, 3, and 4 show the liquid supplying section 38 provided at one of the side edge portions of the casting bead 40. The same liquid supplying section 38 is provided at the other side edge portion of the casting bead 40.

As shown in FIGS. 3 and 4, the nozzle 43 is provided on the tapered surface 36d of the casting die 36. A tip 46 of the nozzle 43 is placed inward from an end E of the discharge opening 36a in the width direction thereof, and contacts with a top end 44a of the guide path 44. The tip 46 has an orifice 46a. The anticoagulant 41 is supplied through the orifice 46a to the guide path 44. By providing the nozzle 43, the anticoagulant 41 is securely supplied to the guide path 44 without spattering. Accordingly, the spattering of the anticoagulant 41 inside the decompression chamber 37 and the like is prevented.

The nozzle 43 is placed inward from the end E of the discharge opening 36a. However, the position of the nozzle 43 is not limited to the above as long as the tip 46 of the nozzle 43 contacts with the top end 44a of the guide path 44. A shape of the orifice 46a may take other shapes than a circle shown in FIG. 47 for example, an elliptical shape, a rectangular shape, or the like. When the shape of the orifice 46a is a circle, it is preferable that its diameter is 0.25 mm.

The guide path 44 is a groove having a cross section of a predetermined shape. The guide path 44 is formed on a diagonal line L on the tapered surface 36d connecting the orifice 46a of the nozzle 43 and the end E. An arrow A1 shows an air suction direction. The suction of air is caused by decompression of the decompression chamber 37. The air suction direction A1 and the diagonal line L are approximately parallel. By forming the guide path 44 as described above, the anticoagulant 41 is securely fed from the orifice 46a to the end E. A width of the guide path 44 is tapered down from the top end 44a to a bottom end 44b.

The anticoagulant 41 supplied from the nozzle 43 is guided from the top end 44a to the bottom end 44b of the guide path 44. After reaching the bottom end 44b, the anticoagulant 41 forms a pool 41a in the close vicinity of the end E due to its self-weight and surface tension. When the size of the pool 41a is increased and reaches a certain value, the anticoagulant 41 starts to flow from the pool 41a to the end E of the discharge opening 36a and the side edge portion of the casting bead 40 by the suction air in the air suction direction A1. Since the anticoagulant 41 is supplied from the nozzle 43 at a constant supply rate, the size of the pool 41a is kept at an approximately constant size, and the anticoagulant 41 is continuously supplied from the pool 41a to the side edge portion of the casting bead 40 with a constant amount in accordance with the supply rate. It is preferable that the supply amount of the anticoagulant 41 is at least 0.05 cm$^3$/min and at most 0.85 cm$^3$/min.

As described above, the anticoagulant 41 is continuously supplied to each pool 41a, and from each pool 41a to the corresponding side edge portion of the casting bead 40. Thus, the both side edge portions of the casting bead 40 are prevented from generating skinning. In addition, by supplying the anticoagulant 41 to the both side edge portions of the casting bead 40, gelation of the both side edge portions of the dope is suppressed, and as a result, softness of the casting bead 40 is improved. Accordingly, flapping of the casting bead 40 caused by suction air of the decompression chamber 37 is reduced. Thus, a uniform film with reduced thickness unevenness is obtained. The pool 41a of a large size may interfere with the air flow in the vicinity of the side edge portion of the casting bead 40, so the diameter of the pool 41a is preferred to be around 1 mm.

The width of the guide path 44 gradually tapers down toward the bottom end 44b so as to facilitate forming the pool 41a. However, the configuration of the guide path 44 is not limited to the above. The guide path 44 may have a uniform width from the top end 44a to the bottom end 44b. A cross section of the guide path 44 is not limited as long as the anticoagulant 41 is securely guided to the end E. For example, a groove nay have a V-shaped cross section, a semicircle cross section, or the like. A depression may be formed at the bottom end 44b of the guide path 44 so as to facilitate forming the pool 41a. The guide path 44 may be a protrusion instead of the groove.

In an embodiment shown in FIGS. 3 and 4, the guide path 44 is a groove formed on the tapered surface 36d of the casting die 36. Instead or in addition, a nozzle 52 shown in FIGS. 5 and 6 may be used to supply the anticoagulant 41 to the side edge portion of the casting bead 40.

Figure 5:
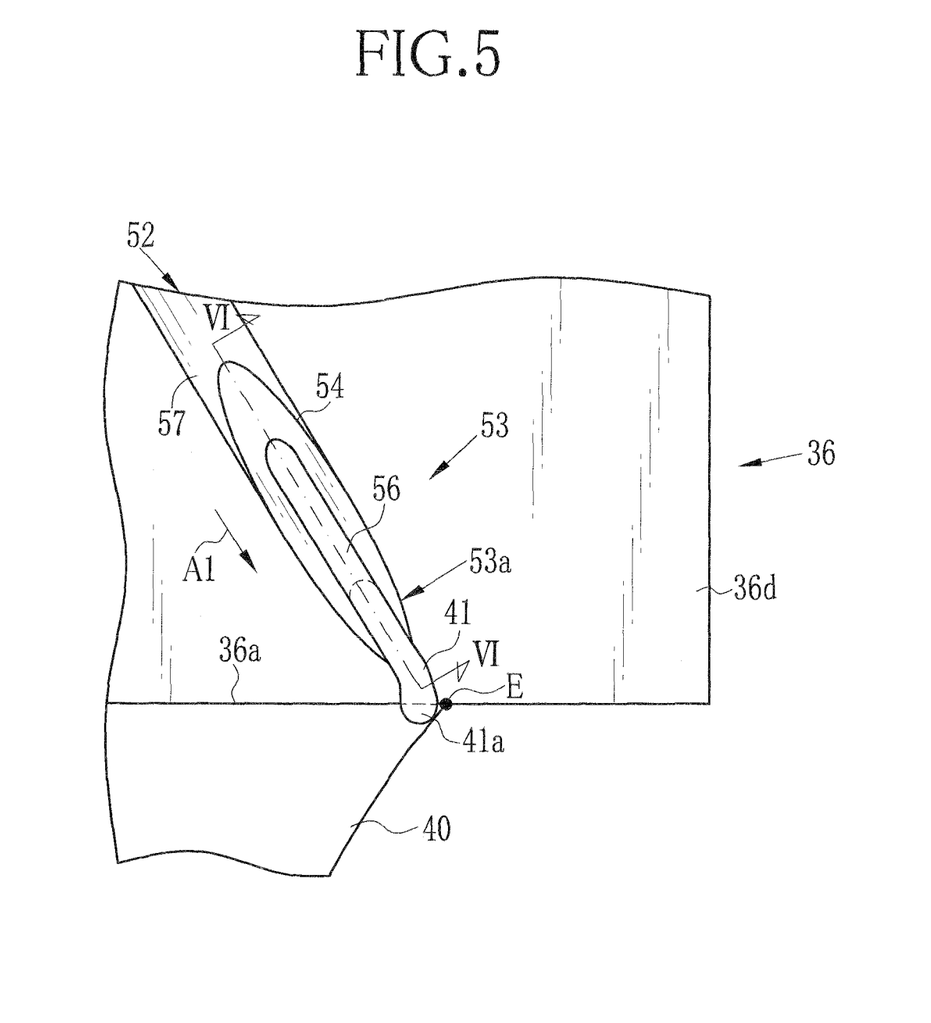
FIG. 5 is a lateral view of the tip of the casting die in the width direction and its vicinity.
Figure 6:
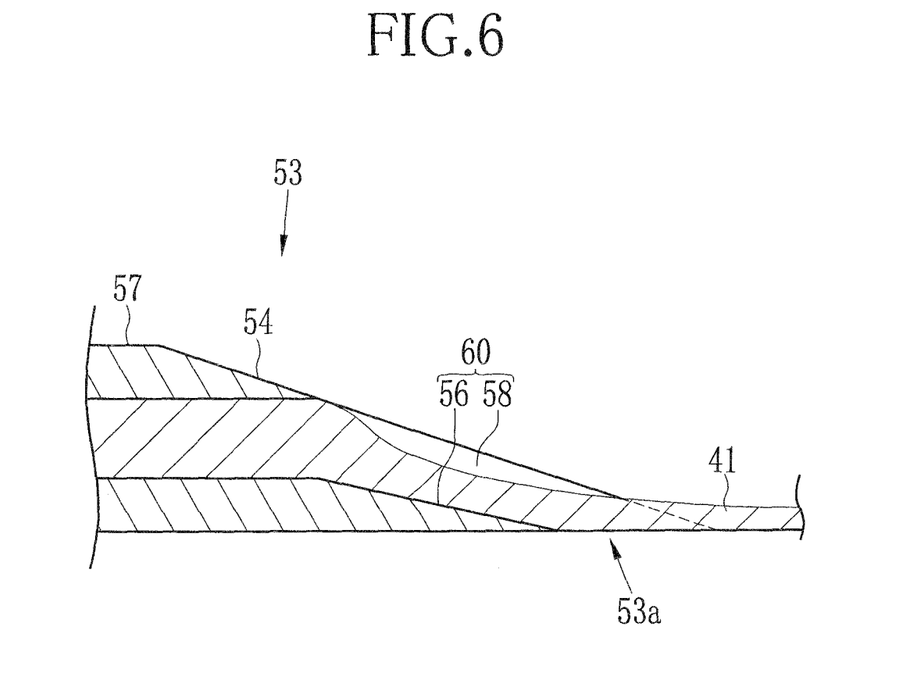
FIG. 6 is an enlarged cross-section view of a nozzle with its tip partly cut off for supplying an anticoagulant.

The nozzle 52 is formed of a cuttable stainless steel tube with a small diameter. The nozzle 52 is provided on the tapered surface 36d approximately parallel to the air suction direction A1 of the decompression chamber 37 in the same manner as in the above embodiment. A tip 53 of the nozzle 52 is cut at a bevel angle across an outer circumferential surface 57 of the nozzle 52, and the cut surface is called a first inclined surface 54. A second inclined surface 56 is formed in a part of the tip 53 of the nozzle 52, lower than the first inclined surface 54. The second inclined surface 56 is diagonally cut from an inner circumferential surface 58 to the outer circumferential surface 57 such that a height of the second inclined surface 56 is reduced toward a tip end 53a with respect to the tapered surface 36d.

A guide section 60 is constituted of the second inclined surface 56 and the inner circumferential surface 58, and guides the anticoagulant 41 to the end E of the discharge opening 36a. Thereafter, the pool 41a is formed by the self-weight and the surface tension of the anticoagulant 41. The pool 41a securely supplies the anticoagulant 41 to the side edge portion of the casting bead 40.

The configuration of the guide section is not limited to those shown in FIGS. 5 and 6 as long as the guide section is formed at or extends from the tip of the nozzle, and forms the pool in the close vicinity of the casting bead. Instead of cutting the tip of the nozzle to form the guide section, a fork-like guide section may be fitted into the tip of the nozzle in advance.

In this embodiment, it is preferable that the casting die 36 has the following configuration. The shape, the material, and the size of the casting die 36 are not particularly limited. A coat hanger type die, which keeps the casting width of the dope approximately uniform, is preferable. It is preferable that the discharge opening 36a is 1.1 times to 2.0 times larger than the casting width of the dope. Precipitation hardened stainless steel is preferable for the material of the casting die 36 in view of durability and heat resistance. It is preferable that the material has the anti-corrosion properties which do not form pitting (holes) on the gas-liquid interface after having been dipped in a liquid mixture of dichloromethane, methanol and water for three months. Further, the material with the almost same anti-corrosion properties as SUS316 in examination of corrosion in electrolyte solution can also be used. In view of heat resistance, the material preferably has a coefficient of thermal expansion at most $2 \times 10^{-5}$(° C.$^{-1}$).

It is more preferable that the discharge opening 36a is provided with a hardened layer so as to improve abrasion resistance. The methods to form the hardened layer are not particularly limited. For example, ceramic coating, hard chrome plating, nitriding treatment and the like may be used. When ceramic is used as the hardened layer, it is preferable that the ceramic is grindable but not friable, and has a lower porosity and good corrosion resistance. The ceramic which sticks to the casting die 36 but does not stick to the dope is preferable. To be more specific, tungsten carbide (WC), $Al_2O_3$, TiN, $Cr_2O_3$ and the like can be used, and WC is especially preferable. A WC coating may be performed by a known spraying method.

To form the casting film with excellent planarity, it is preferable that a contact surface of the casting die 36 which contacts with the dope is smoothed by polishing or the like. It is preferable to install a suction device (riot shown) at the side edge portions of the casting die 36 and suck air at a suction air volume of 1 liter/min to 100 liter/min. Thereby, air flow causing asperities on the surface of the casting bead 40 is prevented.

As shown in FIG. 1, the transfer section 12 is provided with a plurality of rollers 61. The rollers 61 convey the wet film 27 to the pin tenter 13. An air blower 62 is provided above the conveying path of the wet film 27. The air blower 62 blows dry air onto the wet film 27 to promote drying of the wet film 27.

In the pin tenter 13, the wet film 27 is conveyed in a state that both side edge portions (hereinafter referred to as edges) of the wet film 27 are pierced and held by the pins. During the conveyance of the wet film 27, the wet film 27 is stretched at a predetermined stretch ratio in the width direction and dried with dry air.

The clip tenter 14 is provided downstream from the pin tenter 13. In the clip tenter 14, the wet film 27 is conveyed and dried in a state that the both edges of the wet film 27 are held by the clips. Thus, a film 63 is produced. The edge slitting device 15 is disposed between the pin tenter 13 and the clip tenter 14, and cuts off the edges of the wet film 27 discharged from the pin tenter 13. The edge slitting device 16 is disposed between the clip tenter 14 and the drying device 17, and cuts off the edges of the film 63 discharged from the clip tenter 14. A crusher 64 is connected to the edge slitting devices 15 and 16. The crusher 64 crushes the cut off edges into chips. After the edges are cut off, the film 63 is sent to the drying device 17. A plurality of rollers 65 are provided in the drying device 17. The film 63 is dried while being conveyed by the rollers 65. The film 63 discharged from the drying device 17 is sent to the cooling device 18, and cooled to approximate room temperature inside the cooling device 18.

The above described transfer section 12, the pin tenter 13, the clip tenter 14, and the drying device 17 are connected to an adsorption-recovery device 67. The adsorption-recovery device 67 is provided outside of the transfer section 12, the pin tenter 13, the clip tenter 14, and the drying device 17. The adsorption-recovery device 67 adsorbs and recovers the solvent vapors generated in the transfer section 12, the pin tenter 13, the clip tenter 14, and the drying device 17. The adsorbed and recovered solvent is reused as a material of the dope.

The winding device 19 is provided with a roll core 70. The film 63 is wound around the roll core 70. The winding device 19 is provided with a press roller 71. The press roller 71 presses the film 63 at the time of winding.

As described above, the film with excellent planarity is stably produced at a high speed. It is preferable that a width of the produced film is not less than 1500 mm and not more than 3000 mm. The present invention is effective even if the width of the produced film exceeds 3000 mm. It is preferable that the thickness of the produced film is not less than 20 μm and not more than 80 μm. It is more preferable that the thickness of the film is not less than 25 μm and not more than 80 μm. It is most preferable that the thickness of the film is not less than 30 μm and not more than 80 μm.

In the above embodiment, a single layer film is produced from one kind of dope. In addition, the present invention is also effective in producing a casting film with a multilayer structure. In this case, any known method is used for casting a desired number of dopes simultaneously or sequentially, and the method to be used is not particularly limited. Paragraphs from [0617] to [0889] of Japanese Patent Laid-Open Publication No. 2005-104148 describe in detail the structures of the casting die, the decompression chamber and the support, co-casting, peeling, stretching, drying condition in each process, handling methods, curling, winding methods after the correction of planarity, recovering methods of the solvent, and recovering methods of a film, and the invention related to the above description may also be applied to the present invention. Performance of the produced film, degrees of curling, thickness, and measuring methods thereof are disclosed in paragraphs from [10731] to [10871] of Japanese Patent Laid-Open Publication No. 2005-104148, and the invention related to the above description may also be applied to the present invention.

It is preferable to apply a surface treatment to at least one surface of the produced film so as to improve adherence between the produced film and optical member of the polarizing filter and the like. Examples of the surface treatments include vacuum glow discharge treatment, atmospheric plasma discharge treatment, UV radiation treatment, corona discharge treatment, flame treatment, acid treatment and alkali treatment. It is preferable to apply at least one of the above surface treatments to the produced film.

The produced film may be used a base film, and a function layer may be applied to at least one of the surfaces of the base film. Thus, a functional film is produced. The functional layer may be, for example, an antistatic layer, a cured resin layer, an antireflection layer, an adhesive layer for easy adhesion, an antiglare layer, or an optical compensation layer. For example, by applying the antireflection layer to the base film, an antireflection film which prevents reflection of light and offers high image quality is produced. The above described functional layers and formation methods are detailed in paragraphs [0890] to [1072] of Japanese Patent Laid-Open Publication No. 2005-104148, and the invention related to the above descriptions may also be applied to the present invention. The polymer film may be used in, for example, TN type, STN type, VA type, OCB type, reflection type, and other types of the LCD devices disclosed in paragraphs [1088] to [1265] of Japanese Patent Laid-Open Publication No. 2005-104148.

Hereinafter, solutes and solvents of the dope produced in the dope producing line 23 according to the embodiment are described.

[Solutes]

It is preferable to use cellulose ester as a solute of the dope so as to produce the film with high degree of transparency. For example, lower fatty acid ester of cellulose, such as cellulose triacetate, cellulose acetate propionate, and cellulose acylate butyrate are preferable as cellulose ester. In order to form a film with excellent optical transparency, cellulose acylate is preferable, and triacetyl cellulose (TAC) is especially preferable. The dope used in the above embodiment contains TAC as the polymer. It is preferable to use TAC particles at least 90 wt. % of which have the diameter in a range of 0.1 mm to 4 mm.

It is preferable that a degree of substitution of acyl groups for hydrogen atoms on hydroxyl groups in cellulose preferably satisfies all of the following mathematical expressions (a)-(c) so as to produce a film with a high degree of transparency.

$$2.5 \leq A+B \leq 3.0 \quad \text{(a)}$$

$$0 \leq A \leq 3.0 \quad \text{(b)}$$

$$0 \leq B \leq 2.9 \quad \text{(c)}$$

In these mathematical expressions (a) to (c), A is the degree of substitution of the acetyl group for the hydrogen atom of the hydroxyl group, and B is a degree of substitution of the acyl group for the hydrogen atom of the hydroxyl group with 3 to 22 carbon atoms.

The cellulose is composed of glucose units making β-1,4 combination, and each glucose unit has a free hydroxyl group at second, third and sixth positions. Cellulose acylate is a polymer in which a part of or the entire of the hydroxyl groups are esterified so that the hydrogen is substituted by acyl group with two or more carbons. The degree of substitution of the acyl groups in cellulose acylate is a degree of esterification of the hydroxyl group at second, third or sixth position in cellulose Accordingly, when all (100%) of the hydroxyl groups at the same position are substituted, the degree of substitution at this position is 1.

When the degrees of substitution of the acyl groups for the hydroxyl group at the second, third or sixth positions per glucose unit are respectively described as DS2, DS3 and DS6, the total degree of substitution of the acyl groups for the hydroxyl group at the second, third and sixth positions (namely DS2+DS3+DS6) is preferably in the range of 2.00 to 3.00, more preferably in the range of 2.22 to 2.90. It is especially preferable that DS2+DS3+DS6 is in the range of 2.40 to 2.88. In addition, DS6/(DS2+DS3+DS6) is preferably at least 0.28, and more preferably not less than 0.30. It is especially preferable that DS6/(DS2+DS3+DS6) is in the range of 0.31 to 0.34.

One or more sorts of acyl group may be contained in the cellulose acylate. When two or more sorts of the acyl groups are used, it is preferable that one of them is acetyl group. If the total degree of substitution of the acetyl groups for the hydroxyl group and that of acyl groups other than the acetyl group for the hydroxyl group at the second, third or sixth positions are respectively described as DSA and DSB, it is preferable that the value DSA+DSB is in the range of 2.22 to 2.90. It is especially preferable that the value DSA+DSB is in the range of 2.40 to 2.88.

It is preferred that the DSB is at least 0.30, and especially preferred to be not less than 0.7. Further, the percentage of the substituent for the hydroxyl group at the sixth position in DSB is preferred to be at least 20%, more preferred to be not less than 25%, further more preferred to be not less than 30%, and especially preferred to be not less than 33%. Further, a value DSA+DSB at the sixth position of cellulose acylate is preferred to be at least 0.75, more preferred to be not less than 0.80, and especially preferred to be not less than 0.85. A dope having excellent solubility is prepared using cellulose acylate satisfying the above conditions.

Cellulose which is a raw material of cellulose acylate may be produced from cotton linter or pulp.

Acyl group, of cellulose acylate, having at least 2 carbon atoms may be aliphatic group or aryl group, and is not particularly limited. For example, alkylcarbonyl ester, alkenylcarbony-ester, aromatic carbonyl ester, aromatic alkylcalbonyl ester and the like of cellulose may be used. Further, the cellulose acylate may be also esters having other substituents. The preferable substituents are propionyl group, butanoyl group, pentanoyl group, hexanoyl group, octanoyl group, decanoyl group, dodecanoyl group, tridecanoyl group, tetradecanoyl group, hexadecanoyl group, octadecanoyl group, iso-butanoyl group, t-butanoyl group, cyclohexane carbonyl group, oleoyl group, benzoyl group, naphtylcarbonyl group, cinnamoyl group and the like. In particular, propionyl group, butanoyl group, dodecanoyl group, octadecanoyl group, t-butanoyl group, oleoyl group, benzoyl group, naphtyl carbonyl group, cinnamoyl group and the like are more preferable, and propionyl group and butanoyl group are especially preferable.

The cellulose acylate usable in the present invention is detailed in paragraphs [0140] to [0195] of Japanese Patent Laid-Open Publication No. 2005-104148, and these descriptions may be applied to the present invention.

[Solvent]

It is preferable to use an organic compound capable of dissolving polymer as the solvent of the dope. In the present invention, a dope is a mixture produced by dissolving or dispersing the polymer in a solvent. Therefore, solvents having low solubility for polymer may also be used. Preferable solvent compounds are, for example, aromatic hydrocarbon (for example, benzene, toluene and the like), halogenated hydrocarbons (for example, dichloromethane, chloroform, chlorobenzene and the like), alcohols (for example methanol, ethanol, n-propanol, n-butanol, diethyleneglycol and the like), ketones (for example acetone, methylethyl ketone and the like), esters (for example, methylacetate, ethylacetate, propylacetate and the like), and ethers (for example tetrahydrofuran, methylceilosolve and the like). A mixed solvent in which two or more kinds of the above solvent compounds are mixed may also be used. Among the above solvent compounds, dichloromethane is preferable. With the use of dichloromethane, the dope with excellent solubility is produced, and the solvent compounds contained in the casting film are evaporated in a short time to form a film.

Of the above halogenated hydrocarbons, those having 1 to 7 carbon atoms are preferable. In view of solubility of polymer, peelability indicating ease of peeling of a casting film from a support, mechanical strength and optical properties of the film, it is preferable to use at least one sort of the alcohols having 1 to 5 carbon atoms with dichloromethane. The content of the alcohols is preferably in the range of 2 wt. % to 25 wt. %, and more preferably in the range of 5 wt. % to 20 wt. % to the total solvent compounds in the solvent. Specific examples of the alcohols include methanol, ethanol, n-propanol, isopropanol, n-butanol, and the like. It is preferable to use methanol, ethanol, n-butanol or a mixture thereof.

In order to minimize the influence on the environment, the dope may be prepared without dichloromethane. In this case, the solvent containing ethers with 4 to 12 carbon atoms, ketones with 3 to 12 carbon atoms, esters with 3 to 12 carbon atoms, or a mixture of them are preferable. The ethers, ketones, and esters may have cyclic structures. At least one solvent compound having at least two functional groups thereof (—O—, —CO—, and —COO—) may be contained in the solvent. The solvent may contain other functional group such as alcoholic hydroxyl group. In the case the solvent compound contains two or more sorts of functional groups, the number of carbons is not particularly limited as long as it is within a specified limit of a compound having any one of the functional groups.

Well-known additives such as plasticizers, UV absorbents, deterioration inhibitors, lubricating agents, and peeling improvers may be added to the dope as necessary. Well-known plasticizers may be used, for example, phosphoric acid ester plasticizers such as triphenyl phosphate and biphenyl diphenyl phosphate, phthalic acid ester plasticizers such as diethyl phthalate, and polyester polyurethane elastomer and the like.

It is preferable to add fine particles to the dope so as to adjust a refractive index of the film and prevent adhesion of the films. It is preferable to use silicon dioxide derivatives as the fine particles. The term "silicon dioxide derivatives" of the present invention includes silicon dioxide, and silicone resin having three-dimensional network structures. The silicon dioxide derivatives with the alkylated surfaces are preferable. Hydrophobized particles such as alkylated particles are well dispersed in the solvent. As a result, the dope is prepared and the film is produced without aggregation of the fine particles. Thereby, the film with a high degree of transparency and few surface defects is produced.

As an example of the above-described fine particles with the alkylated surfaces, commercially available Aerosil R805 (produced by Degussa Japan, Co., Ltd.), which is a silicon dioxide derivative introduced with octyl group on the surface, or the like may be used. In order to produce the film with a high degree of transparency while the effectiveness of the fine particles is ensured, the content of the fine particles with respect to the solid content of the dope is preferably not more than 0.2%. In addition, in order to prevent the fine particles from interfering with light, the average particle diameter is preferably not more than 1.0 μm and more preferably 0.3 μm to 1.0 μm. It is especially preferable that the particle diameter is in a range of 0.4 μm to 0.8 μm.

As described above, it is preferable to use TAC as the polyer to produce a polymer film with a high degree of optical transparency. In this case, a ratio of TAC is preferably 5 wt. % to 40 wt. %, more preferably 15 wt. % to 30 wt. %, and especially preferably 17 wt. % to 25 wt. % with respect to a total amount of the dope mixed with solvents and additives. A ratio of the additives (mainly plasticizers) is preferably 1 wt. % to 20 wt. % with respect to the whole solid content including polymer and other additives contained in the dope.

Solvents, additives such as plasticizers, UV absorbents, deterioration inhibitors, lubricating agents, peeling improvers, optical anisotropy controllers, retardation controllers, dyes, and peeling agents, and fine particles are detailed in paragraphs [0196] to [0516] of Japanese Patent Publication No. 2005-104148, and these descriptions may be applied to the present invention. In addition, materials, raw materials, dissolution methods and adding methods of additives, filtering methods, and defoaming are disclosed in paragraphs [0517] to [0616] of Japanese Patent Laid-Open Publication No. 2005-104148, and these descriptions may be applied to the present invention.

Hereinafter the present invention is concretely described with examples 1 to 5 and comparative examples 1 to 3. However, the present invention is not limited to the following examples.

EXAMPLE 1

The film was produced using the film producing line 10 shown in FIG. 1. An appropriate amount of the dope was fed from the dope producing line 23 to the casting die 36 through the feed block 35. The casting film 26 was formed by casting the dope from the casting die 36 onto the continuously rotating casting drum 22. At the time of casting, a discharge amount of the dope was adjusted such that the film after drying had the thickness of 60 μm.

The casting drum 22 was a stainless steel drum capable of controlling the number of rotations. The surface temperature of the casting drum 22 was adjusted at −10° C. by supplying a coolant inside the casting drum 22 from the heat transfer medium supply device. The inner temperature of the casting chamber 11 was constantly kept at 35° C. using the temperature controller 33.

The casting film 26 was cooled and gelated. Upon obtaining the self supporting property, the casting film 26 was peeled off as the wet film 27 using the peel roller 28. The peeled wet film 27 was sent to the transfer section 12. While being supported by the plurality of rollers 61 provided in the transfer section 12, the wet film 27 was dried by supplying dry air at 40° C. from the air blower 62.

The wet film 27 was sent to the pin tenter 13. In the pin tenter 13, the wet film 27 was conveyed in a state that the edges of the wet film 27 were pierced by the pins. During the conveyance, the wet film 27 was stretched in the width direction and dried with dry air.

After passing through the pin tenter 13, the wet film 27 was sent to the clip tenter 14. In the clip tenter 14, the wet film 27 was dried while being conveyed in a state that the edges of the wet film 27 were held by the clips. Thus, the film 63 was produced. The edge slitting devices 15 and 16 were used for cutting off the edges of the wet film 27 and the film 63 respectively. The cut edges of the film 63 were sent to the crusher 64 through a cutter blower (not shown) and crushed into chips with the average size of 80 mm$^2$.

A predrying chamber (not shown) was provided between the edge slitting device 16 and the drying device 17. In the predrying chamber, dry air at 100° C. was supplied and the film 63 was preheated. Thereafter, the film 63 was sent to the drying device 17. In the drying device 17, the film 63 was dried while being conveyed in a state that the film 63 was bridged across the rollers 65. The inner temperature of the drying device 17 was adjusted such that the surface temperature of the film 63 reached 140° C. The film 63 was dried in the drying device 17 for 10 minutes. The surface temperature of the film 63 was measured using a thermometer (not shown) provided in a position immediately above and close to the surface of the film 63 on the conveying path.

The adsorption-recovery device 67 was connected to the transfer section 12, the pin tenter 13, the clip tenter 14, and the drying device 17. The adsorption-recovery device 67 had an adsorbing agent (not shown) composed of activated carbon and a desorbing agent (not shown) composed of dry nitrogen. The adsorption-recovery device 67 recovered the solvent vapors generated in the transfer section 12, the pin tenter 13, the clip tenter 14, and the drying device 17. Thereafter, water was removed from the solvent vapors until the water content reached 0.3 wt. % or less.

A moisture control chamber (not shown) was provided between the drying device 17 and the cooling device 18. Air at the temperature of 50° C. and dew point of 20° C. was supplied to the film 63. Thereafter, air at 90° C. and humidity of 70% weredirectly blown onto the film 63 to flatten the curled portions. Next, the film 63 was sent to the cooling device 18. The film 63 was gradually cooled until the temperature became 30° C. or less.

The film 63 was sent to the winding device 19. The film 63 was wound around the roll core 70 having the diameter of 169 mm, while 50 N/m of pressure was applied to the film 63 using the press roller 71. A tension at the start of winding was 300 N/m. A tension at the end of winding was 200 N/m. Thus, the film 63 was wound in a roll form.

As shown in FIG. 2, the discharge opening 36a of the casting die 36 had a predetermined shape, and the width of the casting die was 1.8 m. The temperature of the dope at the casting was 36° C. The decompression chamber 37 reduced the pressure of the upstream side from the casting bead 40 to −600 Pa.

As shown in FIGS. 3 and 4, the pool 41a of the anticoagulant 41 was formed in close proximity to each side edge portion of the discharge opening 36a of the casting die 36 with the use of the guide path 44. The anticoagulant 41 was continuously supplied to each side edge portion of the casting bead 40 through the pool 41a. The supply rate of the anticoagulant 41 supplied from the nozzle 43 was 0.2 cm$^3$/min.

The produced film had the film thickness of 60 μm and the width of 1.8 m. The average drying speed of the casting film, the wet film, and the film was 20 wt. %/min throughout the film producing process.

In this embodiment, the pts. mass of the raw materials were as follows. A solvent mixture of dichloromethane (a first component of the solvent), methanol (a second component of the solvent), and nbutanol (a third component of the solvent) which was prepared in advance and stored in the solvent tank (not shown) was used.

| | |
|---|---|
| TAC powder (degree of substitution was 2.86, viscometric average degree of polymerization was 306, moisture content was 0.2 mass %, viscosity of 6 mass % of dichloromethane solution was 315 mPa · s, average particle diameter was 1.5 mm and average variation of the particle diameter was 0.5 mm) | 100 pts. mass |
| dichloromethane (the first component of solvent) | 400 pts. mass |
| methanol (the second component of the solvent) | 77 pts. mass |
| n-butanol (the third component of the solvent) | 5 pts. mass |
| plasticizer A (triphenylphosphate) | 7.6 pts. mass |
| plasticizer B (diphenylphosphate) | 3.5 pts. mass |

TAC used in this example contained the following. The remaining content of acetic acid was 0.1 mass % or less. The Ca content was 5 ppm. The Mg content was 42 ppm. The Fe content was 0.5 ppm. The free acetic acid was 40 ppm. The sulfuric ion content was 15 ppm. The acetone extract was 8 mass %, and a ratio of weight-average molecular weight to number-average molecular weight was 2.7. Further, yellow index was 6.0, haze was 0.08, and transparency was 93.5%. Tg (glass transition temperature measured by DSC) was 160° C., and calorific value in crystallization was 6.4 J/g. This cellulose triacetate was synthesized from cellulose obtained from pulp.

The examples 2 to 5 and the comparative examples 1 to 3 were performed in the same manner as the example 1 except for the conditions of supplying the anticoagulant 41 to the both side edge portions of the casting bead 40.

EXAMPLE 2

The anticoagulant 41 was supplied using the guide path 44 in the same manner as the example 1. The supply rate of the anticoagulant 41 from the nozzle 43 was 0.3 cm³/min.

EXAMPLE 3

The anticoagulant 41 was supplied using the guide path 44 in the same manner as the example 1. The supply rate of the anticoagulant 41 from the nozzle 43 was 0.85 cm³/min.

EXAMPLE 4

The anticoagulant 41 was supplied using the guide path 44 in the same manner as the example 1. The supply rate of the anticoagulant 41 from the nozzle 43 was 0.8 cm³/min.

EXAMPLE 5

The anticoagulant 41 was supplied using the guide path 44 in the same manner as the example 1. The supply rate of the anticoagulant 41 from the nozzle 43 was 0.05 cm³/min.

COMPARATIVE EXAMPLE 1

The anticoagulant 41 was supplied to the both edge portions of the casting bead 40 without the use of the guide path 44. The supply rate of the anticoagulant 41 from the nozzle 43 was 0.2 cm³/min.

COMPARATIVE EXAMPLE 2

The anticoagulant 4 was supplied to the both edge portions of the casting bead 40 without the use of the guide path 44. The supply rate of the anticoagulant 41 from the nozzle 43 was 0.05 cm³/min.

COMPARATIVE EXAMPLE 3

The anticoagulant 41 was supplied to the both edge portions of the casting bead 40 without the use of the guide path 44. The supply rate of the anticoagulant 41 from the nozzle 43 was 0.95 cm³/min.

TABLE 1

| | guide path | supply rate (unit: cm³/min) | vibration | agglomeration |
|---|---|---|---|---|
| E1 | Y | 0.2 | A | A |
| E2 | Y | 0.3 | A | A |
| E3 | Y | 0.85 | B | A |
| E4 | Y | 0.8 | A | A |
| E5 | Y | 0.05 | A | B |
| CE1 | N | 0.2 | F | A |
| CE2 | N | 0.05 | F | F |
| CE3 | N | 0.95 | F | A |

The table 1 shows the results of the examples 1 to 5 and the comparative examples 1 and 3. In the table 1, E1 to E5 denote examples 1 to 5, and CE1 to CE3 denote comparative examples 1 to 3. "Guide path" denotes the guide path 44. "Y" denotes that the guide path 44 was used. "N" denotes that the guide path 44 was not used. "Supply rate" denotes the supply rate of the anticoagulant 41 from the nozzle 43. "Agglomeration" denotes semi-solidified dope in an icicle-like shape formed at each side edge portion of the discharge opening 36a of the casting die 36. "Vibration" denotes the vibrations of the casting bead 40, namely the flapping of the casting bead 40. "A" denotes that the agglomeration and the vibrations of the casting bead 40 were suppressed. "B" denotes that the agglomeration and the vibrations of the casting bead 40 occurred to some extent, but the produced film did not have any problems. "F" denotes that the agglomeration and the vibrations of the casting bead 40 were not reduced, and as a result, the produced film had problems. According to the results shown in the Table 1, the agglomeration and the vibrations of the casting bead 40 were suppressed with the use of the guide path 44.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A solution casting method comprising the steps of:
   (a) discharging a dope from a slit of a casting die onto a moving endless support to form a casting film, said dope containing cellulose acylate and a solvent;
   (b) discharging an anticoagulant from an orifice of a liquid supplying nozzle toward a side edge of said slit, said orifice being located above said slit, said anticoagulant being a liquid;
   (c) forming a pool of said anticoagulant in a close vicinity of said side edge of said slit by guiding said discharged anticoagulant to the close vicinity of said side edge of said slit using a guide path, said guide path being located downstream from said slit with respect to a moving direction of said support, and formed on a surface of said casting die, a width of said casting die in said moving direction of said support being gradually tapered down toward said slit, and said casting die has a tapered surface located between a front surface and a land surface having said slit when said casting die is viewed from downstream in said moving direction of said support, said orifice of said liquid supplying nozzle is located on said tapered surface in a position closer to a center of said casting die than said side edge of said slit with respect to said width direction of said support, and said liquid supplying nozzle has a guide section on its tip, and a height of said guide section is gradually reduced with respect to said tapered surface toward a lower end of said guide section, and said guide path is formed of said guide section;

(d) supplying, through said pool, said anticoagulant to said side edge of said slit and a side edge portion of a casting bead in a width direction of said support, said casting bead being said dope between said slit and said support, and said guide path is located on a diagonal line connecting said orifice and said side edge portion of said casting bead;

(e) peeling said casting film from said support as a wet film; and (f) producing a film by drying said wet film, wherein a decompression chamber is disposed in an upstream direction from said casting bead with respect to said moving direction to reduce air flow, and wherein a supply rate of said anticoagulant is at least 0.05 $cm^3$/min and at most 0.85 $cm^3$/min.

2. The solution casting method of claim 1, wherein said guide path is constituted of a groove or a protrusion formed on said tapered surface.

3. The solution casting method of claim 1, wherein said anticoagulant is a solvent mixture of dichloromethane and methanol, and a ratio of said dichloromethane/methanol is at least 2/3 and at most 3/2.

4. The solution casting method of claim 1, wherein a moving speed of said support is at least 50 m/min, and a thickness of said film is at least 20 μm and at most 80 μm, and a width of said film is at least 1.5 μm and at most 3.0 μm.

5. The solution casting method of claim 1, wherein a width of said guide path is gradually smaller toward said slit.

* * * * *